(12) United States Patent
Ueda et al.

(10) Patent No.: US 8,566,723 B2
(45) Date of Patent: Oct. 22, 2013

(54) MENU BAR PROVIDING METHOD AND INFORMATION BROWSING SCREEN CONFIGURATION FILE CREATION PROGRAM

(75) Inventors: Michiyoshi Ueda, Minato-ku (JP);
Takeshi Fujita, Minato-ku (JP);
Tsutomu Kawachi, Minato-ku (JP)

(73) Assignee: Sony Corporation, Tokyo (JP)

( * ) Notice: Subject to any disclaimer, the term of this patent is extended or adjusted under 35 U.S.C. 154(b) by 845 days.

(21) Appl. No.: 11/937,957

(22) Filed: Nov. 9, 2007

(65) Prior Publication Data
US 2008/0126946 A1    May 29, 2008

Related U.S. Application Data

(63) Continuation-in-part of application No. PCT/JP2005/008629, filed on May 11, 2005.

(51) Int. Cl.
*G06F 3/00* (2006.01)

(52) U.S. Cl.
USPC .......................................... 715/733; 715/738

(58) Field of Classification Search
USPC ....................................................... 715/733
See application file for complete search history.

(56) References Cited

U.S. PATENT DOCUMENTS

| | | | |
|---|---|---|---|
| 5,884,246 A | | 3/1999 | Boucher et al. |
| 5,890,172 A | * | 3/1999 | Borman et al. ............... 715/205 |
| 5,987,454 A | * | 11/1999 | Hobbs ................................... 1/1 |
| 6,535,912 B1 | * | 3/2003 | Anupam et al. .............. 709/217 |
| 7,325,014 B1 | * | 1/2008 | Kennedy ............................... 1/1 |
| 7,426,687 B1 | * | 9/2008 | Schultz et al. ................ 715/208 |
| 7,502,994 B2 | * | 3/2009 | Kocol ............................ 715/205 |
| 2002/0054126 A1 | * | 5/2002 | Gamon ........................... 345/781 |
| 2003/0001875 A1 | * | 1/2003 | Black et al. .................... 345/708 |
| 2003/0128234 A1 | * | 7/2003 | Brown et al. .................. 345/744 |

(Continued)

FOREIGN PATENT DOCUMENTS

| | | |
|---|---|---|
| EP | 0848337 A1 | 6/1998 |
| JP | 10-116235 | 5/1998 |

(Continued)

OTHER PUBLICATIONS

European Search Report issued Mar. 14, 2012, for corresponding European Appln. No. 05739337.3.

*Primary Examiner* — Stephen Alvesteffer
(74) *Attorney, Agent, or Firm* — K&L Gates LLP

(57) ABSTRACT

It is an object of the present invention to enable displaying of a desired Web page and also displaying of a Web page including a menu bar without first displaying a predetermined Web page which a user does not want on a second display area of the Web browser, and also to execute a content based on the content execution request accepted from a content execution input unit of the menu bar. In order to solve this object, processing means extract a portion from which a self-domain 211 is removed from the Web page identifier received from an external terminal device as a second Web page identifier. Next, the processing means newly create an information browsing screen configuration file, store information browsing screen configuration information 212 in the information browsing screen configuration file, also store a first Web page identifier 213 and a first display area identifier 214 in a correlated manner, and also store the extracted second Web page identifier and a second display area identifier 215 in a correlated manner.

2 Claims, 7 Drawing Sheets

(56) References Cited

U.S. PATENT DOCUMENTS

| | | | |
|---|---|---|---|
| 2004/0165007 A1* | 8/2004 | Shafron | 345/781 |
| 2004/0243923 A1* | 12/2004 | Nakamura | 715/500 |
| 2005/0039144 A1* | 2/2005 | Wada et al. | 715/840 |
| 2005/0256866 A1* | 11/2005 | Lu et al. | 707/5 |
| 2006/0085766 A1* | 4/2006 | Dominowska et al. | 715/854 |
| 2006/0218247 A1* | 9/2006 | Sauve et al. | 709/219 |

FOREIGN PATENT DOCUMENTS

| | | |
|---|---|---|
| JP | 11-296463 | 10/1999 |
| JP | 2002-032412 | 1/2002 |
| JP | 2002-063201 | 2/2002 |
| JP | 2002-259337 | 9/2002 |
| JP | 2002-290438 | 10/2002 |
| JP | 2003-050765 | 2/2003 |
| JP | 2004-303218 | 10/2004 |
| JP | 2005-149157 | 6/2005 |

* cited by examiner

HTML FILE (INFORMATION BROWSING SCREEN CONFIGURATION FILE)

```
<HTML>
  <FRAMESET rows="30%,70%">                                        — 601
  <FRAME SRC="http://www.algeb.com/menu.htm" NAME="frame1">        — 602
  <FRAME SRC="http://www.visionarts.co.jp" NAME="frame2">
  </FRAMESET>
</HTML>
``` of which a menu bar providing program is stored in storage means, and an address of an information providing system belonging to the self-domain name, in a correlated manner. The processing means of the information providing system receive, from an external terminal device, a Web page identifier including a domain name, a path name, and a file name of which a self-domain name is removed, extract a first Web page identifier, a menu bar providing program, and an address of the information providing system belonging to the self-domain name with reference to the storage means when the path name and the file name match the first Web page identifier, generate a browsing screen configuration file for providing an information browsing screen including a first display area on which a menu bar is displayed and a second display area on which a Web page is displayed using the menu bar providing program and the address of the information providing system belonging to the self-domain name, transmit the browsing screen configuration file to the external terminal device, and provide a Web page including a menu bar having a content execution request input unit on the first display area of the information browsing screen to the external terminal device.

MENU BAR PROVIDING METHOD AND INFORMATION BROWSING SCREEN CONFIGURATION FILE CREATION PROGRAM

CROSS REFERENCE TO RELATED APPLICATION

This application is a continuation-in-part of international application PCT/JP/2005/008629, with an international filing date of May 11, 2005, the complete disclosure of which is hereby incorporated by reference in its entirety.

FIELD OF THE INVENTION

The present invention relates to a technique for displaying a new Web page, and also using a menu bar provided by an information providing system.

BACKGROUND OF THE INVENTION

Heretofore, in the case of referring a Web page provided by a Web server, the URL (Uniform Resource Locator) corresponding to a desired Web page has been input to a URL input unit of a tool bar, which is embedded in a Web browser of a terminal device as default, thereby displaying the Web page on the screen of the Web browser.

On the other hand, some of Web servers have provided such as the following Web page. The Web page provided by the Web server includes a menu bar having a content execution request input unit. This Web page includes buttons from menu 1 through menu n each associated with a predetermined content as a content execution request input unit for accepting a predetermined content execution request.

The Web browser of the terminal device displays this Web page, and in response to one of those buttons being pressed by way of a mouse, the corresponding predetermined content can be executed. Examples of a content to be executed include an application for providing a calendar function, and an application for providing a schedule function.

SUMMARY OF THE INVENTION

Note however, with the above-described existing example, upon a new URL being input to the URL input unit of the tool bar embedded in the Web browser of the terminal device as default, a new Web page corresponding to the input URL is displayed on the screen of the Web browser, which prevents a desired situation wherein not only a desired Web page but also a Web page including a menu bar are displayed, and a content can be executed based on the content execution request accepted from the content execution request input unit of the menu bar.

Therefore, the present applicant has filed an application relating to a menu bar program capable of displaying a new Web page, and also using a menu bar provided by an information providing system (see Japanese Patent Application No. 2003-386028).

FIG. 11 is a configuration diagram of a screen which the processing means of a terminal device to which the invention disclosed in Patent Document 1 is applied display on a Web browser as an information browsing screen. The processing means of the terminal device accept a predetermined URL (Uniform Resource Locator) from a URL input unit 701 of a tool bar embedded in the Web browser as default, and also in response to the enter key or the like of a keyboard being pressed, transmit an acquisition request of an information browsing screen configuration file to a menu bar providing Web server serving as an information providing system. Subsequently, the processing means of the terminal device display, based on the information browsing screen configuration file received from the menu bar providing Web server, a menu bar including a Web page identifier input unit 704 and a content execution request input unit 705 on a first display area 702 of the Web browser, and also display a predetermined Web page on a second display area 703 of the Web browser. Subsequently, the processing means of the terminal device can accept a URL as a Web page identifier corresponding to a desired Web page from the Web page identifier input unit 704 of the above-mentioned menu bar, and also in response to accepting an execution request from input means, can display a desired Web page on the second display area 703 of the Web browser.

Note however that with the above-mentioned existing example, in order to display not only a desired Web page but also a Web page including a menu bar, and execute a content based on a content execution request accepted from the content execution request input unit 705 of the menu bar, the processing means of the terminal device have needed to display the menu bar including the Web page identifier input unit 704 and content execution request input unit 705 on the first display area 702 of the Web browser, and also temporarily display a predetermined Web page which a user does not want on the second display area 703 of the Web browser.

It is an object of the present invention to improve inconvenience of such an existing example, and particularly to enable displaying of a desired Web page and also displaying of a Web page including a menu bar without first displaying a predetermined Web page which a user does not want on the second display area of the Web browser, and also execute a content based on the content execution request accepted from the content execution input unit of the menu bar.

In order to solve the above-mentioned object, the present invention employs the following arrangements.

An invention according to Claim 1 is a menu bar providing method for providing a Web page including a menu bar to an external device with a computer system of which the communication network is connected with a name resolving system and an information providing system. The storage means of the name resolving system include a name resolving file storing a self-domain name which is a domain name to which the information providing system belongs, and also store an arbitrary subordinate domain name and the address of the information providing system in a correlated manner. The processing means of the name resolving system receive the domain name included in a Web page identifier from an external terminal device. Subsequently, the processing means of the name resolving system extract a self-domain name with reference to the name resolving file. Subsequently, the processing means of the name resolving system extract a portion from which the extracted self-domain name is removed from the received domain name as a subordinate domain name. Also, the processing means of the name resolving system extract the address of the information providing system correlated with the extracted subordinate domain name with reference to the name resolving file. Subsequently, the processing means of the name resolving system transmit the extracted address of the information providing system to the external terminal device. On the other hand, the storage means of the information providing system store a self-domain name which is the domain name of the domain to which the information providing system belongs, a first Web page identifier for identifying a Web page on which a menu bar including a content execution request input unit is displayed, information browsing screen configuration information for dividing an information browsing screen into a first display area and a second display area, a first display area identifier for identifying the first display area, and a second display area identifier for identifying the second display area. The processing means of the information providing system receive a Web page identifier from the external terminal device. Subsequently, the processing means of the information providing system extract a self-domain name from the storage means of the information providing system. Subsequently, the processing means of the information providing system extract a portion from which the extracted self-domain name is removed from the received Web page identifier as a second Web page identifier. Also, the processing means of the information providing system extract a first Web page identifier, information browsing screen configuration information, a first display area identifier, and a second display area identifier from the storage means of the information providing system. Subsequently, the processing means of the information providing system create an information browsing screen configuration file newly, store in the information browsing screen configuration file the extracted information browsing screen configuration information, also store the extracted first Web page identifier and the extracted first display area identifier in a correlated manner, and also store the extracted second Web page identifier and the extracted second display area identifier in a correlated manner. Subsequently, the processing means of the information providing system transmit the created information browsing screen configuration file to the external terminal device.

An invention according to Claim 2 is an information browsing screen configuration file creation program employed for an information providing system including storage means of information, communication means as to an external terminal device, and processing means for controlling the operation of each of these means. Subsequently, the storage means store a self-domain name which is the domain name of the domain to which the information providing system belongs, a first Web page identifier for identifying a Web page on which a menu bar including a content execution request input unit is displayed, information browsing screen configuration information for dividing an information browsing screen into a first display area and a second display area, a first display area identifier for identifying the first display area, and a second display area identifier for identifying the second display area. On the other hand, the processing means extract a self-domain name from the storage means. Subsequently, the processing means extract a portion from which the extracted self-domain name is removed from the Web page identifier received from the external terminal device as a second Web page identifier. Subsequently, the processing means extract a first Web page identifier, information browsing screen configuration information, a first display area identifier, and a second display area identifier from the storage means. Next, the processing means create an information browsing screen configuration file newly, store in the information browsing screen configuration file the extracted information browsing screen configuration information, also store the extracted first Web page identifier and the extracted first display area identifier in a correlated manner, and also store the extracted second Web page identifier and the extracted second display area identifier in a correlated manner.

ADVANTAGES

The processing means of the information providing system extract a portion from which the self-domain name is removed from the Web page identifier received from the external terminal device as a second Web page identifier corresponding to a desired Web page which the user wants to browse, store the second Web page identifier thereof and the second display area identifier in the information browsing screen configuration file in a correlated manner, and also the processing means of the terminal device receive the information browsing screen configuration file thereof, and display the Web page corresponding to the second Web page identifier on the second display area of the information browsing screen, whereby the processing means of the terminal device can display a desired Web page and also display a Web page including a menu bar without first displaying a predetermined Web page which the user does not want on the second display area of the Web browser, and also execute a content based on the content execution request accepted from the content execution input unit of the menu bar.

DETAILED DESCRIPTION OF ILLUSTRATIVE EMBODIMENTS

Description will be made below regarding an embodiment of the present invention with reference to the drawings.

Figure 1:
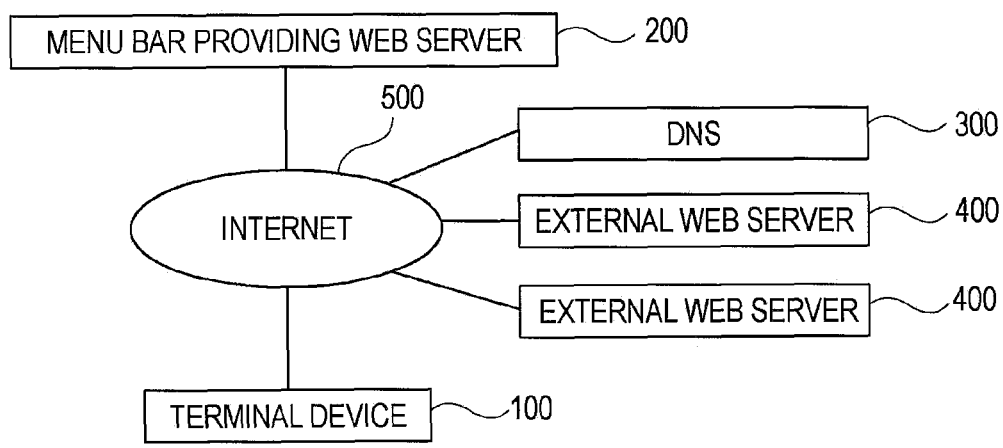
FIG. 1 is a block diagram illustrating the overall configuration of a system according to the present embodiment.

FIG. 1 is a block diagram illustrating the overall configuration of a system according to the present embodiment.

A terminal device 100, a menu bar providing Web server 200 serving as an information providing system, a DNS 300 (Domain Name System) serving as a name resolving system, and an external Web server 400 serving as an external information providing system are connected to the Internet 500 serving as a communication network.

The menu bar providing Web server 200 is configured to transmit Web page display control information including a menu bar to the requesting terminal device 100 based on the request from the terminal device 100. Also, the terminal device 100 is configured to display a Web page including a menu bar based on the display control information received from the menu bar providing Web server 200. Further, the DNS 300 is configured to convert the domain name of a domain which is subordinate to the domain managed by the DNS 300 into the IP address of the menu bar providing Web server 200. On the other hand, the external Web server 400 is configured to transmit the display control information of a predetermined Web page to the requesting terminal device 100 based on the request from the terminal device 100. Here, the external Web server 400 is connected to the Internet 500 such that a third party other than the users of the menu bar providing Web server 200 and the terminal device 100 provides a content or the like. Also, with the present embodiment, multiple external Web servers 400 are connected to the Internet 500, but these external Web servers 400 employ a common configuration including processing means such as a CPU, storage means such as an HDD, RAM, ROM, and so forth, and communication means such as a NIC, and store the display control information of a predetermined Web page in the storage means thereof.

Figure 2:
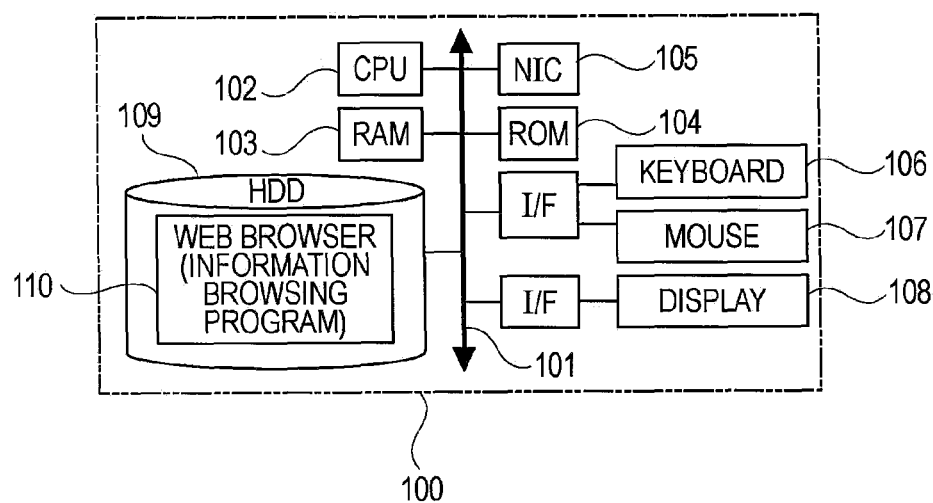
FIG. 2 is a configuration diagram of a terminal device.

FIG. 2 is a configuration diagram of a common PC (Personal Computer) serving as the terminal device 100. A keyboard 106 and a mouse 107 which serve as input means, a display 108 serving as display means, a CPU 102 serving as processing means, RAM 103, ROM 104, and HDD 109 (Hard Disk Drive) which serve as storage means, and a NIC 105 (Network Interface Card) serving as communication means are connected to a bus 101. An I/F represents the interface between the bus 101 and various types of device. A Web browser 110 or the like serving as an information browsing program is stored in the HDD 109. The CPU 102 of the terminal device 100 is configured to receive the display control information of the Web page including the menu bar from the menu bar providing Web server 200 to display the Web page thereof by reading the Web browser 110 stored in the HDD 109 to the RAM 103 and executing this.

Figure 3:
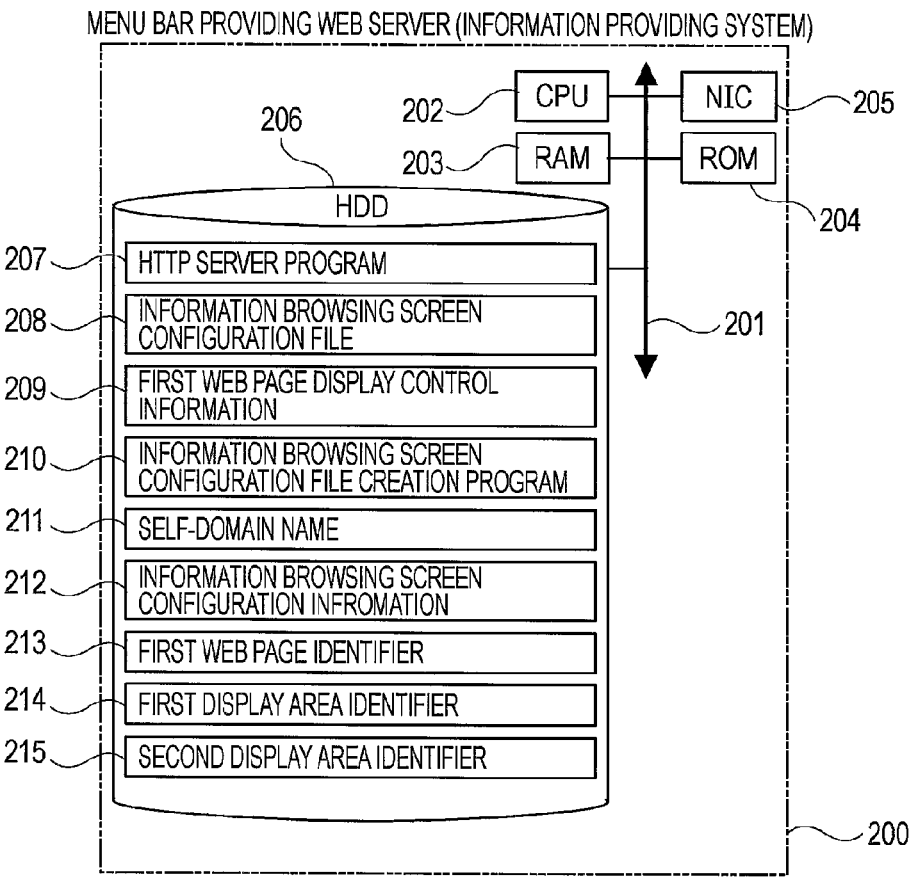
FIG. 3 is a configuration diagram of a menu bar providing Web server.

FIG. 3 is a configuration diagram of the menu bar providing Web server serving as an information providing system. A CPU 202 serving as processing means, RAM 203, ROM 204, and HDD 206 (Hard Disk Drive) which serve as storage means, and a NIC 205 (Network Interface Card) serving as communication means are connected to a bus 201. An I/F represents the interface between the bus and various types of device. An HTTP server program 207, an information browsing screen configuration file 208, first Web page display control information 209, an information browsing screen configuration file creation program 210, and a self-domain name 211 are stored in the HDD 206. Also, information browsing screen configuration information 212 for dividing a Web browser into a first display area and a second display area, a first Web page identifier 213 for identifying a first Web page, a first display area identifier 214 for identifying the first display area of the Web browser, and a second display area identifier 215 for identifying the second display area of the Web browser are stored in the HDD 206.

Examples of the HTTP server program 207 include apache (registered trademark), and IIS (registered trademark). The CPU 202 provides a function for transmitting the information browsing screen configuration file 208 and the first Web page display control information 209 and the like to the terminal device 100 based on the URL (Uniform Resource Locator) transmitted via the Web browser of the terminal device 100 by reading the HTTP server program 207 stored in the HDD 206 to the RAM 203 and executing this. Also, the CPU 202 provides a function for creating the information browsing screen configuration file 208 based on the information browsing screen configuration information 212 and the like stored in the HDD 206 by reading the information browsing screen configuration file creation program 210 stored in the HDD 206 to the RAM 203 and executing this.

The information browsing screen configuration file 208 stores information for dividing the display area of the Web browser serving as an information browsing screen into the first display area and the second display area, and so forth. Also, the first Web page display control information 209 is the display control information of the Web page including the menu bar. Examples of the information browsing screen configuration file 208 include an HTML file for defining frames. Also, the first Web page display control information 209 includes a menu bar program which is a program for causing the CPU 102 of the terminal device 100 to execute processing for displaying a menu bar. With the present embodiment, the menu bar program thereof is described with Java (registered trademark) Script, but may be described with another language. Also, a self-domain name is the domain name of the domain to which the menu bar providing Web server 200 belongs. With the present embodiment, ".algeb.com" is stored in the HDD 206 as a self-domain name.

Figure 4:
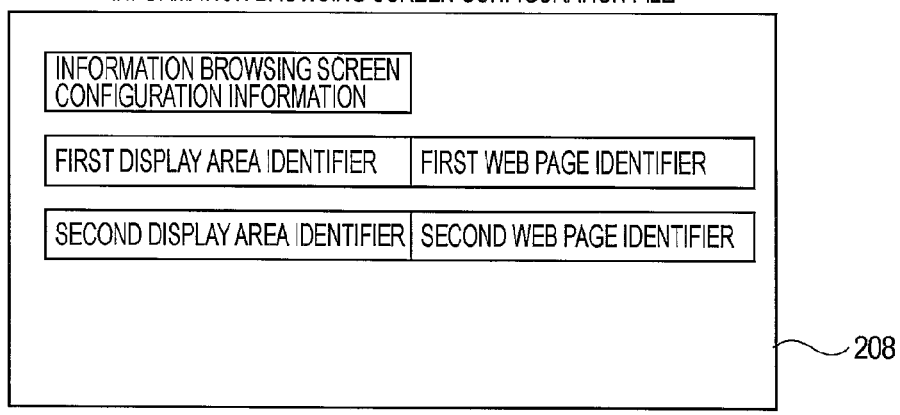
FIG. 4 is a configuration diagram of an information browsing screen configuration file.

FIG. 4 is a configuration diagram of the information browsing screen configuration file 208 stored in the HDD 206 of the menu bar providing Web server 200. The information browsing screen configuration file 208 stores information browsing screen configuration information for dividing the information browsing screen into the first display area and the second display area. The <FRAMESET> tag of an HTML file corresponds to the information browsing screen configuration information. Also, the information browsing screen configuration file 208 stores the first display area identifier for identifying the first display area, and the first Web page identifier for identifying the first Web page in a correlated manner. Further, the information browsing screen configuration file 208 stores the second display area identifier for identifying the second display area, and the second Web page identifier for identifying the second Web page in a correlated manner. A frame name specified in the <FRAME> tag of an HTML file corresponds to the first display area identifier and the second display area identifier, and a URL specified in the <FRAME> tag of an HTML file corresponds to the first Web page identifier and the second Web page identifier, for example. Now, the information browsing screen configuration file 208 is a file created by the CPU 202 of the menu bar providing Web server 200, and the details thereof will be described later.

Figure 5:
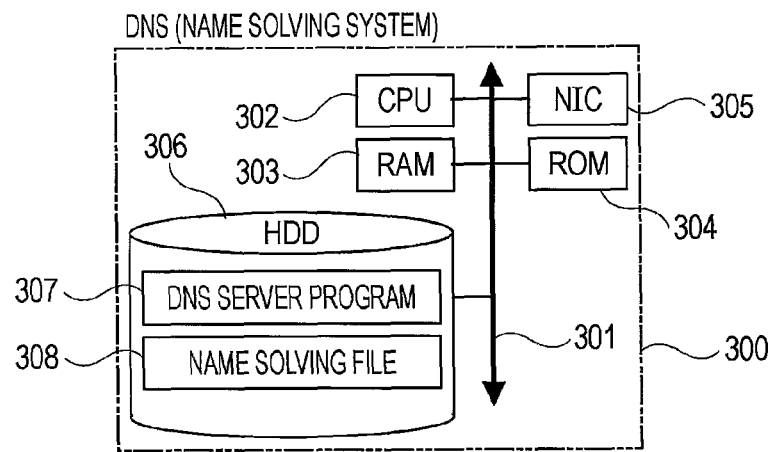
FIG. 5 is a configuration diagram of a DNS.

FIG. 5 is a configuration diagram of the DNS 300 serving as a name resolving system. A CPU 302 serving as processing means, RAM 303, ROM 304, and HDD 306 (Hard Disk Drive) which serve as storage means, and a NIC 305 (Network Interface Card) serving as communication means are connected to a bus 301. I/F represents the interface between the bus and various types of device. A DNS server program 307, a name resolving file 308, and so forth are stored in the HDD 306. BIND (registered trademark) or the like corresponds to the DNS server program 307. The CPU 302 provides a function for transmitting the IP address corresponding to the FQDN (Fully Qualified Domain Name) transmitted via the Web browser of the terminal device 100 by reading the DNS server program 307 stored in the HDD 306 to the RAM 303 and executing this.

Figure 6:
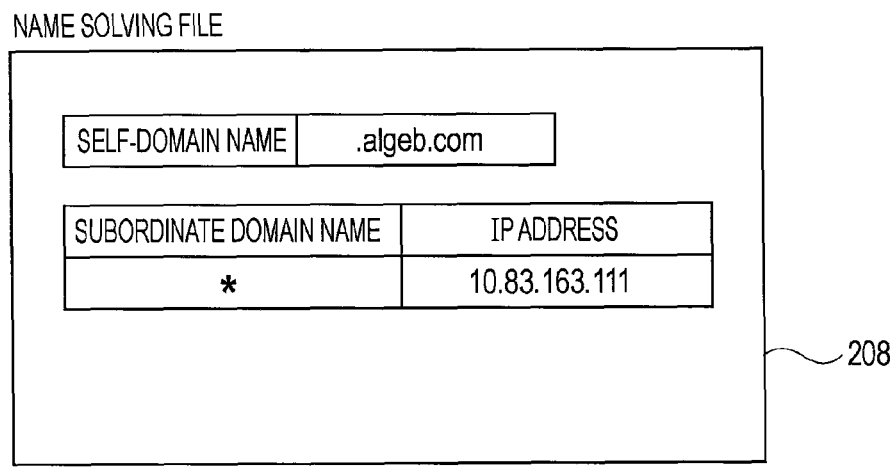
FIG. 6 is a configuration diagram of a name resolving file.

FIG. 6 is a configuration diagram of a name resolving file 308 stored in the HDD 306 of the DNS 300. The name resolving file 308 thereof stores the domain name of the domain to which the menu bar providing Web server 200 belongs as a self-domain name. With the present embodiment, ".algeb.com" is stored in the name resolving file 308 as a self-domain name. Also, the name resolving file 308 stores a subordinate domain name representing the domain name of a domain subordinate to the domain to which the menu bar providing Web server 200 belongs, and the IP address corresponding to the menu bar providing Web server 200 in correlated manner. Now, a subordinate domain name is set to serving as a wild card representing an arbitrary text string.

Description will be made next regarding the operation of the system according to the present embodiment.

Figure 7:
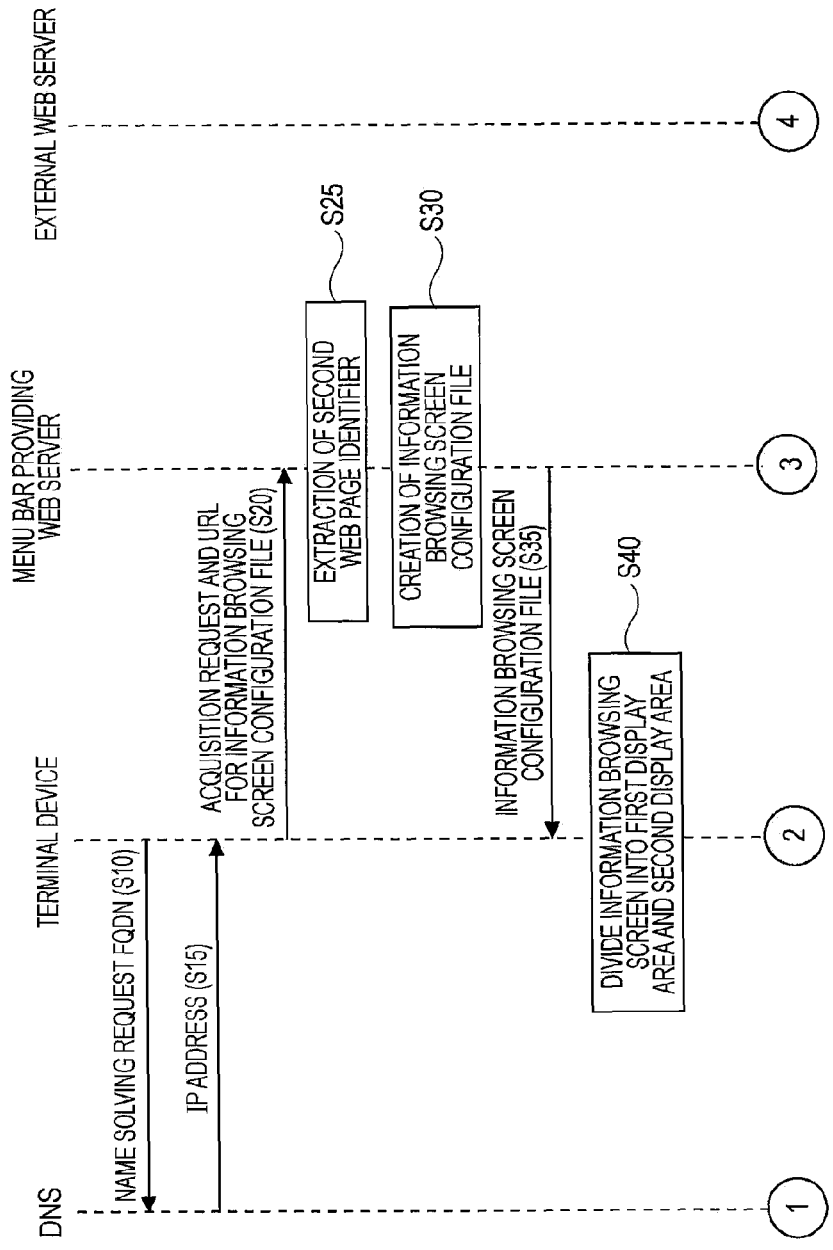
FIG. 7 is a flowchart of the terminal device, menu bar providing Web server, DNS, and an external Web server.
Figure 8:
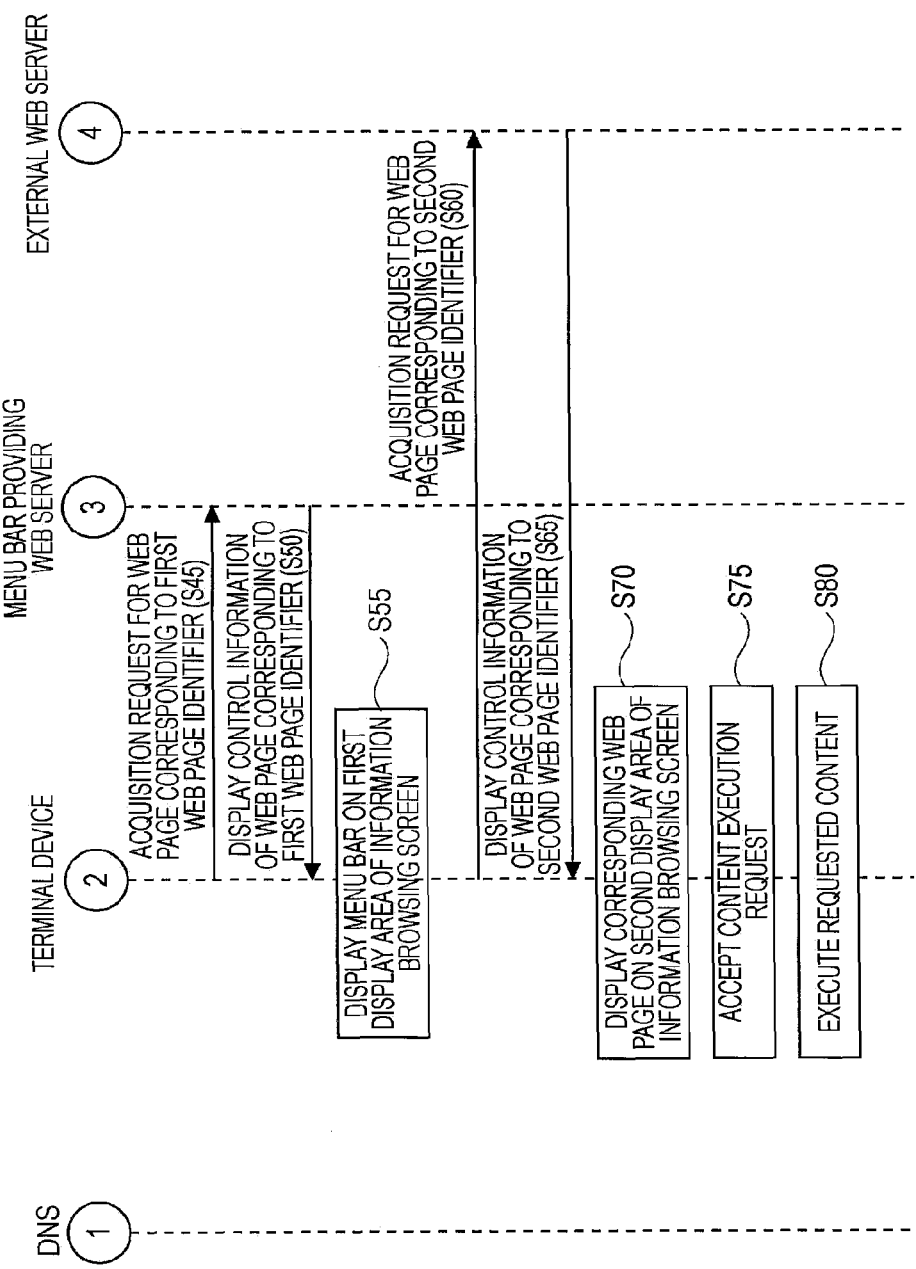
FIG. 8 is a flowchart of the terminal device, menu bar providing Web server, DNS, and external Web server.

FIG. 7 and FIG. 8 are flowcharts of the terminal device 100, menu bar providing Web server 200, DNS 300, and external Web server 400.

Now, processing from the next steps S5 through S10 is implemented with the process of the Web browser which the CPU 102 of the terminal device 100 executes.

The CPU 102 of the terminal device 100 accepts a predetermined URL at the URL input unit 701 of the Web browser (S5). A predetermined URL as stated here is a self-domain name stored in the name resolving file 308 being appended to the back of the URL of a desired Web page. For example, in the event that a user desires browsing of the Web page corresponding to the Web page identifier "http://www.vision-arts.co.jp", the user inputs "http://www.visionarts.co.jp.algeb.com" from the keyboard at the URL input unit 701 of the Web browser.

Subsequently, the CPU 102 of the terminal device 100 performs the next processing in response to the enter key or the like of the keyboard being pressed. The CPU 102 of the terminal device 100 extracts FQDN (Fully Qualified Domain Name) from which a portion of "http://" representing a protocol is removed from the accepted predetermined URL. For example, in the event of accepting "http://www.vision-arts.co.jp.algeb.com" at the URL input unit 701, the CPU 102 of the terminal device 100 extracts "http://www.vision-arts.co.jp.algeb.com" as an FQDN. Subsequently, the CPU 102 of the terminal device 100 transmits the acquisition request (name resolving request) of the IP address corresponding to the extracted FQDN, and the extracted FQDN to the DNS 300 (S10).

Now, processing from the next steps S13 through S15 is implemented with the process of the DNS server program 307 which the CPU 302 of the DNS 300 executes.

Now, the CPU 302 of the DNS 300 which received the name resolving request takes out a self-domain name with reference to the name resolving file 308 (S13). With the present embodiment, the CPU 302 of the DNS 300 takes out ".algeb.com" as a self-domain name. Subsequently, the CPU 302 of the DNS 300 extracts a portion from which the self-domain name taken out from the received FQDN is removed as a subordinate domain name. Subsequently, the CPU 302 of the DNS 300 takes out the IP address correlated with the subordinate domain name extracted with reference to the name resolving file 308. Now, the name resolving file 308 stores a subordinate domain name of serving as a wild card representing an arbitrary text string, and the IP address of the menu bar providing Web server 200 in a correlated manner, so the CPU 302 of the DNS 300 always takes out the IP address of the menu bar providing Web server 200 as to an arbitrary subordinate domain name. Subsequently, the CPU 302 of the DNS 300 transmits the IP address taken out to the terminal device 100 from which the name resolving request has been received (S15).

Now, according to the process of the Web browser, the CPU 102 of the terminal device 100 transmits the acquisition request of the information browsing screen configuration file 208 corresponding to the URL accepted from the URL input unit 701 of the Web browser, and the URL thereof to the menu bar providing Web server 200 corresponding to the received IP address (S20).

Subsequently, according to the process of the HTTP server program 207, the CPU 202 of the menu bar providing Web server 200 receives the acquisition request of the information browsing screen configuration file 208 and the URL.

Now, processing from the next steps S23 through S33 is implemented with the process of the information browsing screen configuration file creation program 210 which the CPU 202 of the menu bar providing Web server 200 executes.

Subsequently, the CPU 202 of the menu bar providing Web server 200 takes out a self-domain name from the HDD 206 (S23). Subsequently, the CPU 202 of the menu bar providing Web server 200 extracts a portion from which the self-domain name is removed from the URL received as a second Web page identifier (S25). Now, the received URL is the self-domain name being appended at the back of the Web page identifier of a Web page which the user desires, i.e., the second Web page identifier thereof is the Web page identifier of a Web page which the user desires.

Subsequently, the CPU 202 of the menu bar providing Web server 200 creates an information browsing screen configuration file 208 such as shown in the following (S30). The CPU 202 of the menu bar providing Web server 200 creates the information browsing screen configuration file 208 corresponding to the received URL as a new file. Subsequently, the CPU 202 of the menu bar providing Web server 200 takes out information browsing screen configuration information from the HDD 206 and stores in the information browsing screen configuration file 208. Subsequently, the CPU 202 of the menu bar providing Web server 200 takes out the first display area identifier and the first Web page identifier from the HDD 206, and stores the first display area identifier thereof and the first Web page identifier in the information browsing screen configuration file 208 in a correlated manner. Further, the CPU 202 of the menu bar providing Web server 200 takes out the second display area identifier from the HDD 206, and stores the second display area identifier thereof and the second Web page identifier extracted from the received URL in the information browsing screen configuration file 208 in a correlated manner (S33).

Figures 9, 10:
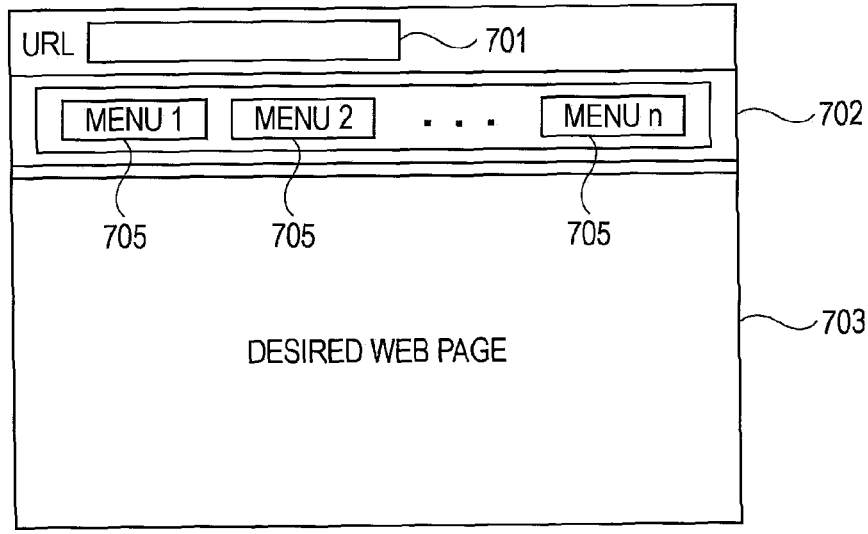
FIG. 9 is a diagram illustrating an example of an HTML file.
FIG. 10 is a configuration diagram of a screen displayed on a Web browser.
Figure 11:
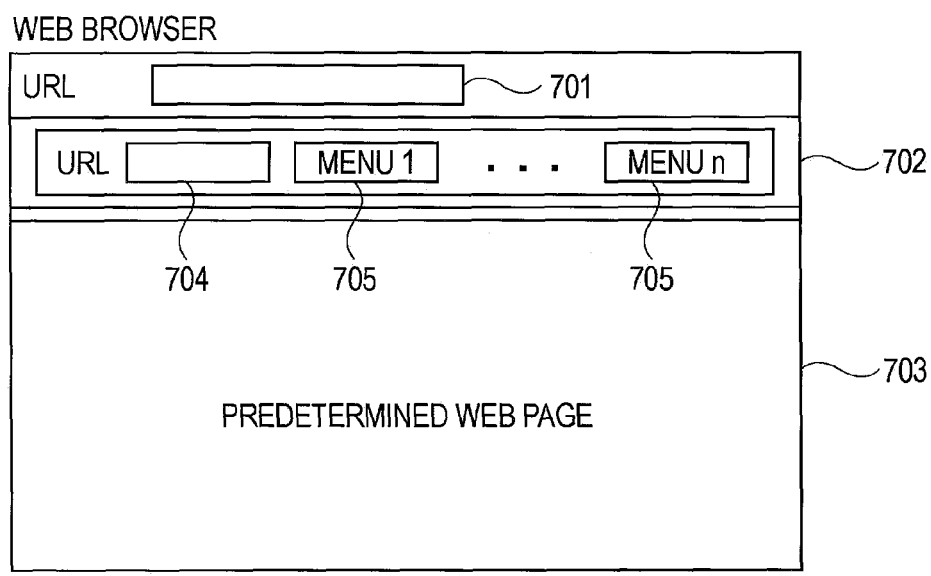
FIG. 11 is a configuration diagram of an existing screen displayed on a Web browser.

FIG. 9 is a diagram illustrating an example of an HTML file serving as the information browsing screen configuration file 208. This HTML file stores <FRAMESET rows="30%, 70%"> as the information browsing screen configuration information (reference numeral 601). The CPU 102 of the terminal device 100 divides the display area of the Web browser serving as the information browsing screen based on the information browsing screen configuration information thereof. Also, this HTML file stores "frame1" serving as the first display area identifier, and "http://www.algeb.com/menu.htm" serving as the first Web page identifier in a correlated manner, and also stores "frame2" serving as the second display area identifier, and "http://www.visionarts.co.jp" serving as the second Web page identifier in a correlated manner (reference numeral 602).

Next, according to the process of the HTTP server program 207, the CPU 202 of the menu bar providing Web server 200 transmits the created information browsing screen configuration file 208 to the terminal device 100 from which the acquisition request of the information browsing screen configuration file 208 has been received (S35).

Now, processing from the next steps S37 through S70 (excluding S50, S55, and S65) is implemented with the process of the Web browser which the CPU 102 of the terminal device 100 executes.

The CPU 102 of the terminal device 100 receives the information browsing screen configuration file 208 and stores this in the HDD 109 (S37). Subsequently, the CPU 102 of the terminal device 100 takes out the information browsing screen configuration information with reference to the information browsing screen configuration file 208. Subsequently, the CPU 102 of the terminal device 100 divides the information browsing screen into the first display area and the second display area based on the information browsing screen configuration information thereof (S40).

Next, the CPU 102 of the terminal device 100 takes out the first Web page identifier with reference to the information browsing screen configuration file 208 stored in the HDD 109. Subsequently, the CPU 102 of the terminal device 100 transmits the acquisition request of the first Web page corresponding to the first Web page identifier taken out to the menu bar providing Web server 200 (S45). According to the process of the HTTP server program 207, the CPU 202 of the menu bar providing Web server 200 takes out the first Web page display control information 209 from the HDD 206 based on the received first Web page acquisition request and transmits this to the terminal device 100 (S50).

Now, the CPU 102 of the terminal device 100 receives the first Web page display control information 209 and stores this in the HDD 109. Subsequently, the CPU 102 of the terminal device 100 takes out the first display area identifier correlated with the first Web page identifier with reference to the information browsing screen configuration file 208. Subsequently, according to the process of the menu bar program included in the first Web page display control information 209 stored in the HDD 109, the CPU 102 of the terminal device 100 displays the menu bar including the content execution request input unit on the first display area corresponding to the first display area identifier (S55).

Next, the CPU 102 of the terminal device 100 takes out the second Web page identifier with reference to the information browsing screen configuration file 208 stored in the HDD 109. Subsequently, the CPU 102 of the terminal device 100 transmits the acquisition request of the second Web page corresponding to the second Web page identifier taken out to the external Web server 400 (S60). According to the process of the HTTP server program, the CPU of the external Web server 400 takes out the second Web page display control information from the HDD based on the received Web page acquisition request and transmits this to the terminal device 100 (S65).

Now, the CPU 102 of the terminal device 100 receives the second Web page display control information and stores this in the HDD 109. Subsequently, the CPU 102 of the terminal device 100 takes out the second display area identifier correlated with the second Web page identifier thereof with reference to the information browsing screen configuration file 208 stored in the HDD 109. Subsequently, the CPU 102 of the terminal device 100 displays the second Web page on the second display area corresponding to the second display area identifier based on the second Web page display control information stored in the HDD 109 (S70). Thus, the CPU 102 of the terminal device 100 displays a Web page which the user desires on the second display area.

FIG. 10 is a configuration diagram of the screen of the Web browser where the menu bar is displayed on the first display area, and also a Web page which the user desires is displayed on the second display area. The Web browser includes the URL input unit 701 at the tool bar embedded therein as default. With the present embodiment, let us say that of the divided display areas, the display area positioned upward is the first display area 702, and the display area positioned downward is the second display area 703. Also, the menu bar includes a menu button serving as the content execution request input unit 705.

Now, processing from the next steps S75 through S80 is implemented with the process of the menu bar program which the CPU 102 of the terminal device 100 executes.

The CPU 102 of the terminal device 100 accepts, in response to the menu button of the menu bar displayed on the first display area of the Web browser being pressed, the content execution request correlated with the button thereof (S75). Subsequently, the CPU 102 of the terminal device 100 executes a predetermined content stored in the HDD of the menu bar providing Web server 200 or the external Web server 400 based on the execution request thereof (S80).

According to the above-mentioned arrangement, a desired Web page can be displayed, and also the Web page including the menu bar can be displayed without first displaying a predetermined Web page which the user does not want on the second display area of the Web browser, and also a content can be executed based on the content execution request accepted from the content execution input unit of the menu bar. Also, there is no need to first display a predetermined Web page which the user does not want, whereby the user can browse a desired Web page more speedily than an existing system.

Note that the present invention is not restricted to this form, and that various applications can be made. For example, in the event that the user desires displaying a Web page corresponding to a Web page identifier "http://www.visionarts.co.jp/dir/cont1.html" in the second display area, "http://www.visionarts.co.jp.algeb.com/dir/cont1.html" may be input at the URL input unit. In this case, the CPU 202 of the menu bar providing Web server 200 extracts "http://www.visionarts.co.jp/dir/cont1.html" from the received URL as the string from which the self-domain name ".algeb.com" has been removed, and takes this as a second Web page identifier.

What is claimed:

1. A menu bar providing method for providing a Web page including a menu bar to an external terminal device with a computer system of which a communication network is connected with a name resolving system and an information providing system, wherein a storage of said name resolving system includes a name resolving file storing a self-domain name which is a domain name to which said information providing system belongs, and also stores an arbitrary subordinate domain name and the address of said information providing system in a correlated manner;

and wherein a processor of said name resolving system executes:

(1) a step for receiving the self-domain name included in a Uniform Resource Locator (URL), from an external terminal device, wherein the URL includes the self-domain name and a subordinate domain name, (2) a step for extracting, from the URL, the self-domain name with reference to the name resolving file, (3) a step for extracting, from the URL from which the extracted self-domain name is removed, a portion as the subordinate domain name, (4) a step for extracting the address of said information providing system correlated with the extracted subordinate domain name with reference to the name resolving file, and (5) a step for transmitting the extracted address of said information providing system to said external terminal device;

and wherein a storage of said information providing system stores a self-domain name which is the domain name of the domain to which said information providing system belongs, a first URL for identifying a Web page on which a menu bar including a content execution request input unit is displayed, information browsing window configuration information for dividing an information browsing window into a first display area and a second display area, a first display area identifier for identifying said first display area, and a second display area identifier for identifying said second display area;

and wherein a processor of said information providing system executes:

(6) a step for receiving the URL from said external terminal device, (7) a step for extracting the self-domain name, from the URL, from the storage of said information providing system, (8) a step for extracting, from said received URL from which the extracted self-domain name is removed, a portion as a second URL, (9) a step for extracting the first URL, the information browsing window configuration information, the first display area identifier, and the second display area identifier from the storage of said information providing system,

(10) a step for creating an information browsing window configuration file newly, storing in the information browsing window configuration file said extracted information browsing window configuration information, also storing said extracted first URL and said extracted first display area identifier in a correlated manner, and also storing said extracted second URL and said extracted second display area identifier in a correlated manner, and

(11) a step for transmitting the created information browsing window configuration file to said external terminal device, wherein the processor of said information providing system is remote from the external terminal device.

2. A non-transitory computer readable medium storing an information browsing window configuration file creation program employed for an information providing system including a storage for storing information, a communication device for communicating with an external terminal device, and a processor for controlling the operation of the storage, the communication device, and the processor, wherein said storage stores a self-domain name which is the domain name of the domain to which said information providing system belongs, a first Uniform Resource Locator (URL) for identifying a Web page on which a menu bar including a content execution request input unit is displayed, information browsing window configuration information for dividing an information browsing window into a first display area and a second display area, a first display area identifier for identifying said first display area, and a second display area identifier for identifying said second display area;

and wherein said program causes said processor to execute:

(1) a step for extracting a self-domain name, from a URL, received from the external terminal device, from said storage, wherein the URL includes the self-domain name and a subordinate domain name, (2) a step for extracting, from the URL from which the extracted self-domain name is removed, a portion as a second URL, (3) a step for extracting the first URL, the information browsing window configuration information, the first display area identifier, and the second display area identifier from said storage, (4) a step for creating an information browsing window configuration file newly, storing in the information browsing window configuration file said extracted information browsing window configuration information, also storing said extracted first URL and said extracted first display area identifier in a correlated manner, and also storing said extracted second URL and said extracted second display area identifier in a correlated manner, wherein said processor is remote from the external terminal device.

* * * * *